June 13, 1950  M. P. W. BLABER  2,511,194
AUTOMATIC TRACKING CONTROL MECHANISM
FOR CONVEYER BELTS
Filed May 31, 1947

MICHAEL P. W. BLABER
INVENTOR

BY Newton M Perrins
Donald H. Stewart
ATTORNEYS

Patented June 13, 1950

2,511,194

UNITED STATES PATENT OFFICE 2,511,194

AUTOMATIC TRACKING CONTROL MECHANISM FOR CONVEYER BELTS

Michael P. W. Blaber, Wealdstone, England, assignor to Eastman Kodak Company, Rochester, N. Y., a corporation of New Jersey Application May 31, 1947, Serial No. 751,554
In Great Britain June 14, 1946

4 Claims. (Cl. 198—202)

1

This invention relates to an automatic tracking control mechanism for a travelling belt, bend, web or the like (hereinafter referred to as a "conveyor belt"), i. e. to a mechanism which will counteract "wandering" of the conveyor belt from side to side during running.

This tendency of the belt to wander is well known and many proposals have been made for overcoming it. One known type of tracking control mechanism may be broadly defined as comprising an idler roller extending across the full width of the belt which it supports and by which it is frictionally driven, such roller being carried by a pivoted mount and being normally aligned with its longitudinal axis at right-angles to the belt centre line, and means, e. g. a pair of pulleys, each bearing against an edge of the belt so that as the latter wanders, the pulleys move with it and constantly vary the angular relationship between the driven roller and the belt, such variation being sufficient for the roller to traverse the belt back to its normal path. In one mechanism of this type as previously proposed, a rod extended forwardly from the bearing block of the idler roller, i. e. in the direction from which the conveyor belt was travelling, and was formed at its free end with a pair of outwardly extending arms each carrying an edge-engaging pulley.

Such tracking mechanisms form an integral part of the conveyor belt system and since they rely solely on the friction between the idler roller or rollers and the belt for their operation, the latter should, to be fully efficient, pass partially around the rollers.

It is an object of this invention to provide an improved automatic tracking control mechanism for a conveyor belt which is a self-contained unit of simple construction that can be applied to one side of an existing conveyor belt assembly at any desired point of its length and which is positive in operation.

According to this invention, an automatic tracking control mechanism for a conveyor belt comprises a pair of rollers or wheels with their axes normally at right-angles to the centre line of the belt and frictionally gripping between them a margin of the belt so as to be driven thereby, the wheels being rotatably mounted on arms projecting laterally from a vertical pivot positioned to one side of the belt, and a pulley directly connected to the pivot and engaging an edge of the belt to follow any deviation of the latter from its correct path, whereupon the angle which the wheels make with the centre-

2 line of the belt is varied to counteract such deviation.

In order that the invention may be more readily understood, one form of automatic tracking control mechanism for a conveyor belt constructed in accordance with the invention will be described, by way of example, with reference to the accompanying drawing, wherein.

Figure 2:
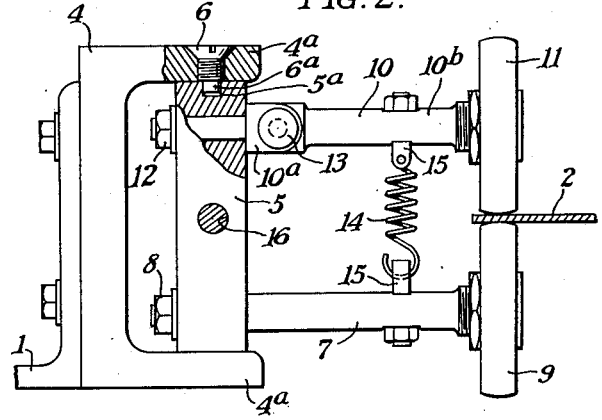
Fig. 2 is a side elevation thereof, partly in section and with the rod carrying the belt edge-engaging pulley removed.

As shown in the drawing, an L-shaped bracket 1 mounted to one side of and spaced from a conveyor belt 2 has a channel-section support 4 bolted or otherwise secured to its vertical limb. A square post 5 is mounted between the horizontal limbs 4a, as by means of countersunk screws 6 formed with reduced end portions 6a engaging axial bores 5a in the post 5, so as to be capable of pivoting about a vertical axis. The reduced end of an arm 7 passes through a lateral bore near the lower end of the pivot post 5 and is secured to the latter by a nut 8. The free end of the arm 7 constitutes a hub for a freely rotatable wheel 9 which bears against the undersurface of a margin of the belt 2. A second arm 10 extending parallel to arm 7 and carrying a freely rotatable wheel 11 bearing on the upper face of said belt margin is secured to the pivot post 5 near its upper end by a nut 12. The arm 10 is in two parts, a part 10a having a reduced portion passing through the post 5 to receive the nut 12 and a part 10b in the forked end of part 10a to swing vertically about a pivot pin 13. A tension spring 14 is anchored at each end to a lug 15 bolted to each of the arms 7, 10 and causes the wheels 9, 11 to grip the belt 2, as shown in Fig. 2, so that they will be rotated frictionally as the belt 2 is driven.

Figure 3:
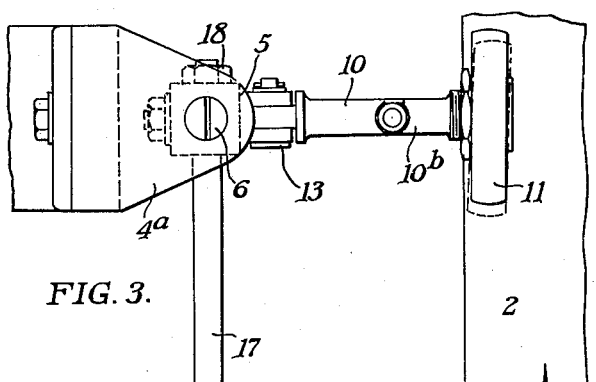
Fig. 3 is a top plan view of the mechanism.
Figure 4:
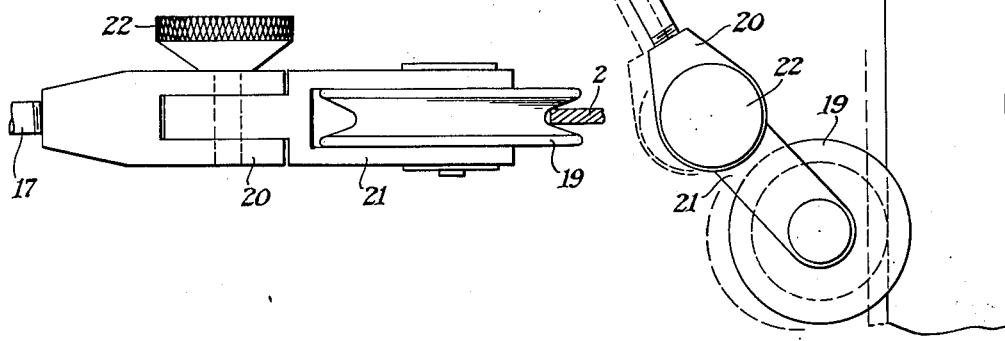
Fig. 4 is a detail view showing the mounting of the edge-engaging pulley.

A bore 16 is formed in the pivot post 5 intermediate and at right-angles to the arms 7, 10 to receive an end of a cranked rod 17 extending in the direction from which the belt 2 travels and secured in position by a nut 18. The free end of rod 17 supports a grooved pulley 19 which is free to revolve about a vertical axis and bears against an edge of the belt 2. Any suitable means may be provided for mounting the pulley 19 and, as shown in Fig. 3, such means may comprise a forked member 20 threaded onto the screw-threaded end of rod 17 and a pulley-carrying fork 21 mounted in the member 20 by a headed clamping screw 22. By this means, the position of the pulley 19 may be varied to traverse the belt laterally.

Figure 1:
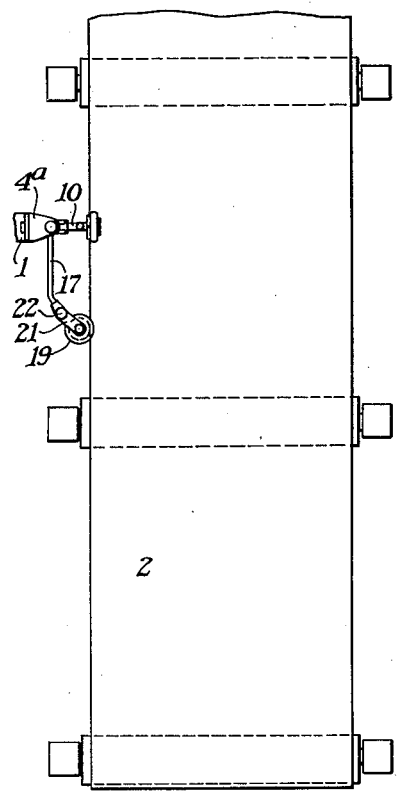
Fig. 1 is a top plan view of an automatic belt tracking control, constructed in accordance with and illustrating a preferred embodiment of my invention.

The operation of the tracking control mechanism is as follows:

When the conveyor belt is running correctly, the grooved pulley 19 is in contact therewith and the axes of the wheels 9, 11 on the upper and lower arms 7, 10 extend at right angles to the direction of travel of the belt 2. Assuming, however, that the belt 2 wanders to the left (as viewed in Fig. 1), the grooved pulley 19 is also moved to the left and the pivot post 5 carrying the arms 7, 10 is rotated, so that the wheels 9, 11 are no longer parallel to the belt edge and thus exert a lateral thrust on the belt in such a direction as to restore the belt 2 to its original position. The same effect is obtained if the belt 2 moves to the right, as viewed in Fig. 1. The pulley 19 in this case immediately follows the movement of the belt due to the shape of the rod 17 and the frictional contact between the pulley surface and the belt edge so that the post 5 and the wheels 9, 11 pivot in the opposite direction to restore the belt to its normal path. If desired, a light spring (not shown) may be provided to set on the rod 17 and ensure positive contact between the pulley 19 and the belt 2.

If desired, the belt-gripping wheels 9, 11 may be duplicated on the other margin of the belt 2 and be controlled from the same edge-engaging pulley 19. If the conveyor belt or the like is of considerable length, it may be desirable to have a plurality of tracking-control mechanisms as above described arranged along the path of the belt, in which case they may be arranged alternately or in pairs adjacent opposite edges of the belt 2.

The sensitivity of the control mechanism is determined by the length of the rod 17 carrying the grooved pulley 19 and it will be understood that the rod 17 may be made adjustable in length in any suitable manner so that the sensitivity of the mechanism may be increased or decreased as desired.

The rod 17 may also be hinged intermediate its length so that the pulley 19 may be set at different positions for belts of different widths, or alternatively, for traversing the belt from side to side into any desired position.

It will be appreciated that the mechanism hereinbefore described is of simple construction, requiring no complicated external control devices, and is inherently automatic in operation, becoming effective immediately upon the slightest deviation of the belt from the normal path.

I claim:

1. An automatic tracking control mechanism for conveyor belts, comprising a pair of rollers, arms for the rollers normally at right angles to a center line of a belt, means for frictionally gripping an edge of the belt between the rollers to drive the rollers from the belt, a pivot carrying the roller arms for swinging movement along the belt and a pulley connected to the pivot and engaging an edge of the belt to follow the latter from its correct path whereupon the angle which the wheels make with the center line of the belt may be varied to counteract such deviation, one of the arms for the rollers including a hinge for movement to and from the other arm, and a spring connecting the two arms for pressing the rollers against opposite sides of the belt.

2. An automatic tracking control mechanism for conveyor belts, comprising a pair of rollers, arms for supporting the rollers normally at right angles to a center line of a belt, a support, a pivot mounted on the support and carrying the arms and extending transversely to the plane of the belt at one side thereof, at least one arm being hingedly attached to the post for movement to and from the other arm, means for urging the pivoted arm toward the fixed arm to cause said rollers to frictionally grip the belt on opposite sides thereof, a grooved pulley engaging an edge of the belt at a spaced distance from the rollers, said grooved pulley being revolvably carried on an arm anchored in the pivot, whereby the turning movement of the pivot in the support may be controlled by the grooved pulley to vary the angular relation of the rollers to the belt.

3. A mechanism according to claim 2 wherein the arm carrying the grooved pulley is at least twice as long as the arms carrying the rollers.

4. A mechanism according to claim 2 wherein the arm carrying the grooved pulley is positioned on the pivot at substantially right angles to the arms carrying the rollers whereby said grooved pulley may engage an edge of the belt a material distance from the rollers to guide the rollers to and from a position in parallelism with the edge of said belt.

MICHAEL P. W. BLABER.

REFERENCES CITED

The following references are of record in the file of this patent:

UNITED STATES PATENTS

| Number | Name | Date |
|---|---|---|
| 769,850 | Thompson | Sept. 13, 1904 |
| 1,360,717 | Bossert | Nov. 30, 1920 |

FOREIGN PATENTS

| Number | Country | Date |
|---|---|---|
| 552,697 | Great Britain | Apr. 20, 1943 |